Aug. 16, 1960

D. E. CARNEY 2,948,989

APPARATUS FOR PRODUCING SHEET GLASS

Filed Oct. 22, 1956

INVENTOR.
Delmar E. Carney
BY
Nobbe & Swope
ATTORNEYS

Aug. 16, 1960  D. E. CARNEY  2,948,989
APPARATUS FOR PRODUCING SHEET GLASS
Filed Oct. 22, 1956  2 Sheets-Sheet 2
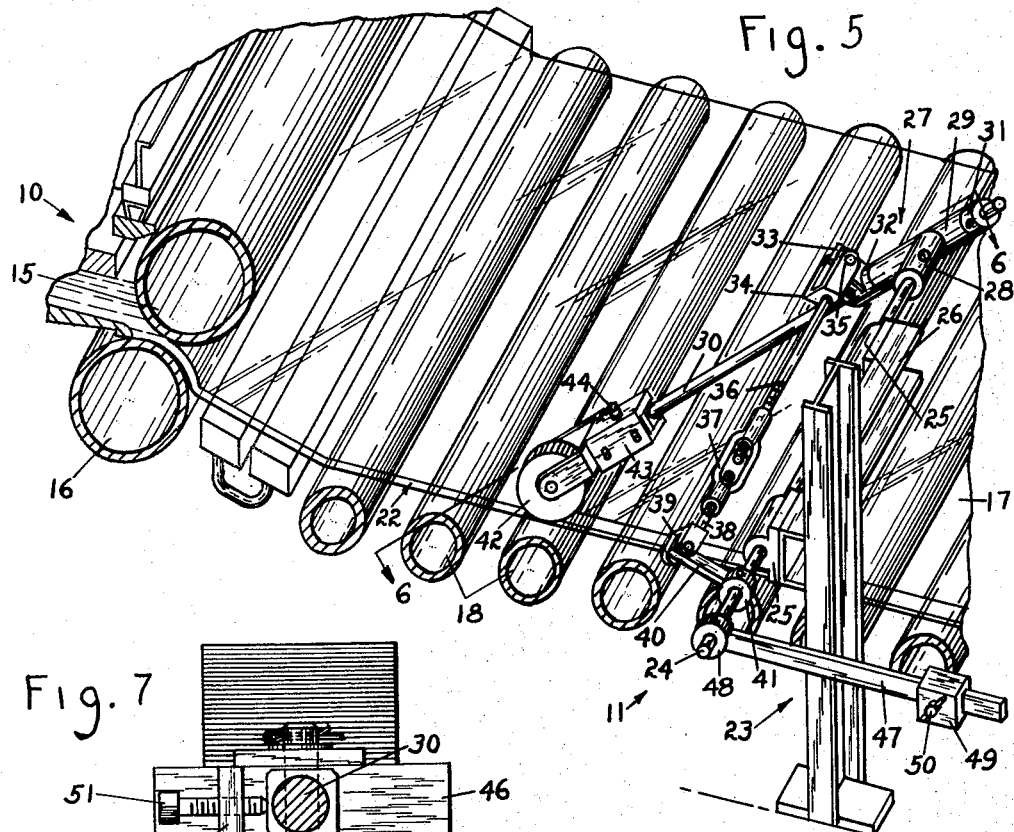
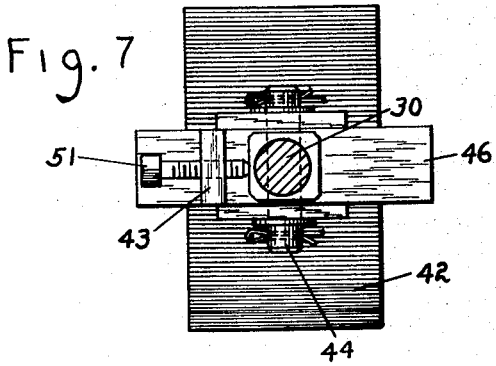
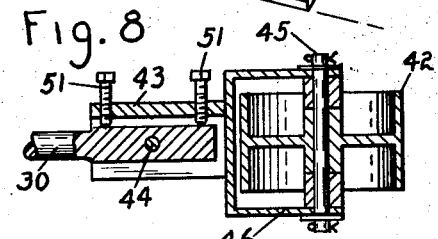
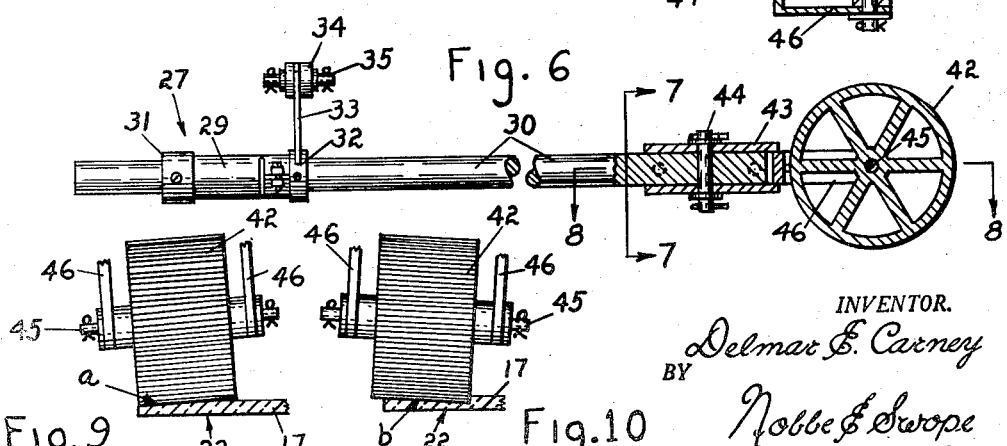
INVENTOR.
Delmar E. Carney
BY
Nobbe & Swope
ATTORNEYS

United States Patent Office 2,948,989
Patented Aug. 16, 1960

2,948,989

APPARATUS FOR PRODUCING SHEET GLASS

Delmar E. Carney, Toledo, Ohio, assignor to Libbey-Owens-Ford Glass Company, Toledo, Ohio, a corporation of Ohio Filed Oct. 22, 1956, Ser. No. 617,643

6 Claims. (Cl. 49—3)

The present invention relates to the manufacture of plate glass, and more particularly to apparatus for treating glass to prevent breakage during the subsequent surfacing thereof.

In the production of plate glass, molten glass from a glass tank or furnace is fed through a suitable opening or spout in the furnace and then between forming rolls which impart a substantially flat shape to the glass to form a continuous glass sheet or ribbon, after which, the sheet or ribbon is passed through a suitable annealing lehr. When annealing has been completed, the glass is conveyed, in one way or another, to surfacing stations where the surfaces thereof are ground to make them substantially true and flat by means of large circular surfacing wheels disposed above, or above and below, the path of the glass. After grinding, the surfaces of the glass are suitably polished to complete the surfacing operation.

Heretofore, relatively large amounts of breakage occurred while the glass was being surfaced, the cause of which was unknown. However, in accordance with the present invention, it has been found that the edge portions of the sheet or ribbon tend to bulge and/or curl slightly after being formed due to the manner in which the sheet lays on the conveying rolls or because of other inherent factors in the forming process. Consequently, in passing the ribbon or sheet beneath the surfacing wheels which project out beyond the edges thereof, there is a tendency for the wheels to make contact first with the bulb or enlarged portion at the edge of the sheet or ribbon before making contact with the central or major surface area thus causing fractures to originate at the edges which, in some cases, migrate inwardly into the interior of the sheet resulting in breakage.

To alleviate or minimize breakage of the glass, it was found according to the present invention, that if the glass sheet or ribbon were treated along the edge portions thereof and reduced in thickness in a predetermined manner before passing to the annealing lehr, that the bulb which normally formed along the edge portion thereof could be depressed below the major surface area of the sheet, and the problem of the surfacing wheels or discs engaging the edges before the main central surface area could be eliminated.

It is therefore a primary object of this invention to provide apparatus for improving the surfacing characteristics of a glass sheet or ribbon.

Another object of the invention is to provide apparatus for reducing glass breakage during the surfacing thereof.

A further object of the invention is to provide means for reducing the thickness of a glass sheet or ribbon prior to annealing in such a manner as to reduce the cross-sectional area of the edge portions of the sheet after it is annealed.

A further object of the invention is to reduce the tendency of thin glass sheet material to bulge or curl at the edge portions thereof so as to protrude above the major surface area of the sheet.

Other objects and advantages of the invention will become more apparent during the course of the following description when taken in connection with the accompanying drawings.

In the accompanying drawings wherein like numerals are employed to designate like parts throughout the same:

Fig. 5 is a fragmentary perspective view of the apparatus for shaping the edge portions of a ribbon or sheet of glass as it leaves a glass melting furnace;

Fig. 6 is a fragmentary sectional view of the shaping apparatus taken substantially along lines 6—6 of Fig. 5;

Fig. 7 is a view of the shaping wheel of the invention taken along lines 7—7 of Fig. 6;

Fig. 8 is a sectional view of the shaping wheel taken substantially along lines 8—8 of Fig. 6;

Fig. 9 shows the position of the shaping wheel with respect to the glass sheet or ribbon according to one embodiment of the invention; and Fig. 10 is a view of an alternate position of the shaping wheel with respect to a ribbon or sheet of glass.

The present invention is not restricted to any particular method of glass grinding or surfacing, however, it is especially well adapted for use in connection with the simultaneous surfacing of both surfaces of a sheet or ribbon of glass and will be described in that relation here.

Figure 1:
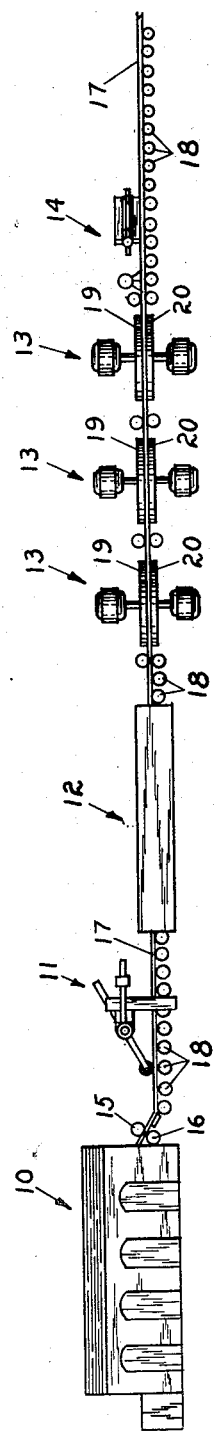
Fig. 1 is a schematic view of a plate glass producing apparatus.
Figure 2:
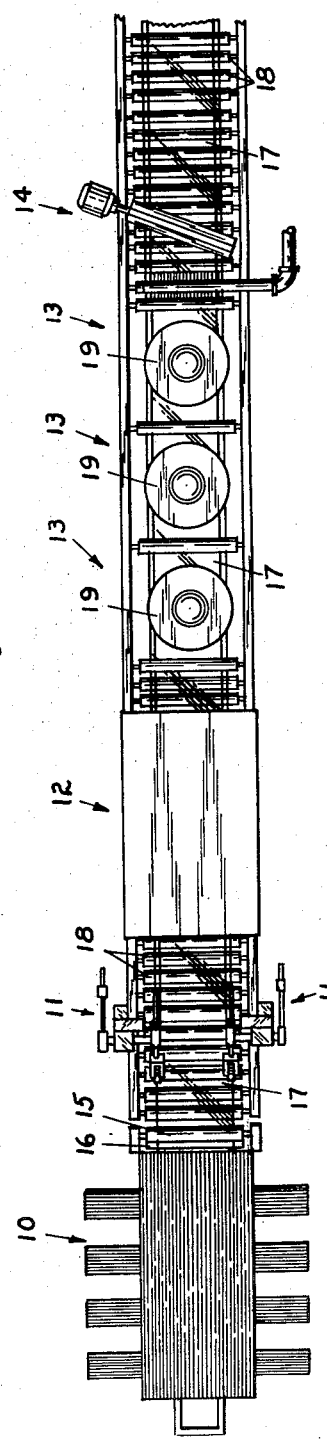
Fig. 2 is a plan view of the apparatus shown in Fig. 1.

With reference now to the drawings, there is shown in Figs. 1 and 2 apparatus for producing plate glass comprising a glass tank furnace 10, sheet edge shaping apparatus 11, an annealing lehr 12, grinding or surfacing apparatus 13, and glass cleaning apparatus 14.

In operation, molten glass flows from the tank furnace 10 and is fed between upper and lower forming rolls 15 and 16 respectively to form a continuous ribbon or sheet of glass 17 of predetermined size or thickness. As the sheet leaves the forming rolls 15, 16, it is received by a suitable conveyor 18 which carries it past the edge shaping apparatus 11 to be described hereinbelow, and then through the annealing lehr 12 wherein the temperature thereof is gradually reduced. Upon leaving the annealing lehr, the ribbon or sheet 17 passes through the surfacing apparatus 13 which includes a plurality of opposed rotating surfacing discs or runners 19 and 20 respectively, which simultaneously surface the sheet or ribbon as it passes therebetween.

In the past, during the surfacing of the glass it was found that relatively large amounts of unexplainable breakage occurred as the sheet began to traverse the path beneath the circular grinding discs or runners 19 and 20. A larger portion of this breakage, as determined by the present invention, had its basis in the fact that the surfacing discs or runners made contact with the edge areas of the sheet before making contact with the major central area thereof because the glass has a tendency to curl at the ends during annealing as indicated at 21 in Fig. 3 because of a differential in cooling between the upper and lower edges. As a consequence, tremendous stresses were placed upon the inherently weaker edge portions of the sheet by virtue of the weight of the upper surfacing discs 19 (Fig. 3) bearing down upon the edge portions and because of the shock forces exerted upon such edge portions by the abrasive or grinding effect of the discs. These stresses naturally, in some cases, caused fissures or cracks to originate along the edges of the sheet which spread inwardly to the central portion of the sheet causing substantial amounts of breakage and considerable losses in surfacing time.

Attempts have been made to overcome this problem by grinding the edges of the ribbon with small grinding wheels after it has been annealed and prior to its being surfaced by the surfacing discs 19 and 20. However, this has not completely solved the problem because the shock imparted to the edges of the sheet by the edge grinding tools also caused fissures or cracks to originate at the edges of the sheet which were exaggerated and caused to migrate inwardly to the central areas of the sheet as the sheet was subsequently surfaced by the larger surfacing discs.

According to the present invention, it has been found that the tendency of the glass ribbon or sheet 17 to chip and fracture as it is being surfaced can be overcome by properly shaping the edges of the glass before it is annealed such that the upper surface of the border areas or edge portions are depressed slightly from the plane of a major surface of the sheet. This shaping of the glass before it reaches the annealing lehr is accomplished by the shaping device 11 which bears against the border or marginal edge portions of the sheet indicated at 22 in Figs. 9 and 10 while the sheet or ribbon is in a formable or semi-soft condition. By shaping the sheet or ribbon before it is annealed, the tendency for stresses or strains to be permanently imparted to the sheet is substantially reduced because of the hot temperature of the glass. Also, the subsequent annealing treatment relieves or balances any stresses or strains which may be imparted to the sheet.

The shaping device 11 is mounted adjacent the conveyor 18 between the furnace 10 and lehr 12 on a support frame 23. More particularly, the shaping device is mounted by means of a support shaft 24 in bearings 25 mounted on a cross arm 26 of the frame. Secured to one end of the shaft 26 is a T connection 27 comprising a section 28 and a section 29, with the section 28 being held in place on the shaft 24 by a suitable set screw.

The section 29 of the T rotatably carries a shaft 30, the shaft 30 being maintained in the base of the T section 29 by means of a collar 31 and a collar 32 both secured to the shaft by suitable set screws. The collar 32 is provided with a finger 33 to which a yoke 34 (Fig. 5) is pivotally attached by means of a pin 35. Yoke 34 is connected through a threaded rod 36 to one side of a turnbuckle 37, while the other side of the turnbuckle 37 is connected by a threaded rod 38 to a yoke 39. The yoke 39 is pivotally fastened by a pin to a finger 40 carried by a collar 41 mounted on the support shaft 24. By rotating the turnbuckle 37, the effective lengths of the threaded rods 36 and 38 may be increased or decreased thereby causing the shaft 30 carried by the T-section 29 to rotate in the T section.

Mounted on the lower end of the shaft 30 is a shaping wheel 42 which is positioned to engage the marginal edge portion 22 of the sheet or ribbon 17. The shaping wheel is pivotally mounted on the lower end of the shaft 30 by a U-shaped member 43 and pivot pin 44. The shaping wheel 42 is rotatably mounted by an axle 45 in a fork 46 secured to the U-shaped member and positioned on opposite sides of the pivot pin 44 enable the shaping wheel assembly to be pivoted about the pin such that the wheel may be moved laterally of the path of the sheet 17. In other words, the wheel assembly can be pivoted laterally toward or away from the central areas of the sheet to engage a greater or lesser area of the marginal edge portion 22 of the sheet.

In order to control the pressure of the shaping wheel 42 on the glass ribbon, there is provided a weighted arm 47 (Fig. 5) secured to an end of the support shaft 24 by a hub 48 and appropriate set screw. The effective weight of the arm 41 is varied by means of a weight 49 which may be moved along the length of the arm by adjusting a screw 50. As may be seen in Fig. 5, the weighted arm 47 acts through the rotatable support shaft 24 to tend to turn the shaft clockwise and thereby tends to have a lifting action on the shaft 30 and shaping wheel 42 to reduce the pressure of the wheel on the glass. Conversely, the weighted arm may be positioned so as to cause the wheel to be pressed toward the glass with greater pressure if it is more desirable to do so.

To enable the marginal edge areas 22 of the ribbon or sheet to be depressed below or made thinner than a major surface area of the sheet, the shaping wheel may be tilted as shown in Fig. 9 to produce a bevelled edge as indicated at $a$, or it may be tilted as indicated at $b$ in Fig. 10 to produce an inverted bevel. In any case, however, the marginal edge portion of the sheet or ribbon does not project beyond the plane of a major surface of the sheet. Adjustment of the surfacing wheel to the position shown in Figs. 9 and 10 is accomplished by turning the shaft 30 by means of the turnbuckle 37 which causes the shaft 30 and wheel 42 to rotate. Further adjustment of the wheel 42 is accomplished by the U-shaped member 43 which is held in adjusted position by set screws 51. It will of course be appreciated that when the shaft 24 is rotated, the finger 40 will be moved the same amount as the shaft 30 and consequently the turnbuckle 37 will be rotated toward or away from the sheet in unison with any movement of the finger 40 and shafts 24 and 30.

Figure 3:
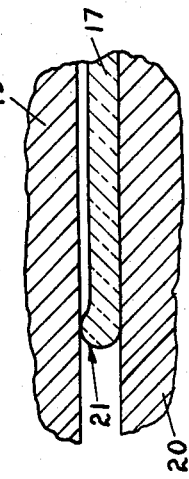
Fig. 3 illustrates a manner in which the surfacing tools initially contact the annealed glass ribbon or sheet according to conventional past practice.
Figure 4:
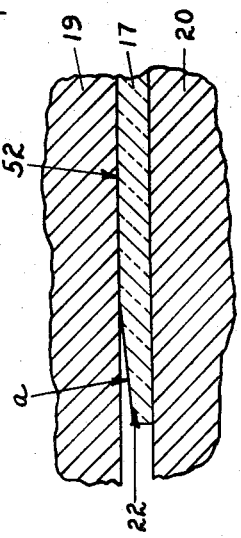
Fig. 4 illustrates the manner in which the surfacing tools contact the annealed ribbon or sheet according to the present invention.

In operation, the glass sheet is formed by passing molten glass from the furnace 10 between forming rollers 15 and 16 after which it moves onto a conveyor 18. While in a semi-soft condition the edge portions 22 of the sheet are shaped such that they are disposed below a major surface area of the sheet by the shaping wheel 42 to an extent such that they will not curl above a major surface area of the sheet after it is annealed. The sheet or ribbon 17 then passes through annealing lehr 12 and thence between opposed surfacing runners or discs 19 and 20. In Fig. 4 there is shown the relationship between the glass 17 and the respective surfacing runners 19 and 20 which illustrates how the marginal edge portion 22 is shaped at $a$ so that the edge portion does not initially contact the upper surfacing runner 19 before the central area of the sheet contacts the surfacing runner as is the case when the marginal edge portions of the sheet are not shaped as is shown in Fig. 3. Thus, in passing between the surfacing discs 19 and 20 the edge portions 22 of the sheet are not initially contacted by the discs. Instead, as illustrated in Fig. 4, the central or major surface area indicated at 52 is contacted first.

Consequently, in grinding a glass sheet or sheets produced in accordance with this invention, extreme shock forces and stresses are not imparted to the edge of the sheet and the tendency of the sheet to break or crack as a result of fissures produced in the edges thereof during surfacing is substantially eliminated. This being the case, the invention is particularly adapted to the production of very thin sheet glass, in the neighborhood of ⅛ inch in thickness, which has a very decided tendency to curl at its edges after forming and which is also extremely fragile because of its thinness making it necessary that the utmost care be exercized in the surfacing process.

It will also be apparent that the invention produces very decided advantages in the subsequent surfacing of the sheet since it is not necessary to trim the bulb portion from the sheet following grinding and before polishing. By leaving the smooth contoured bulb on the sheet material as it is being polished, the polishing felts are not subjected to the sharp edges which normally result when the edges of the sheets are trimmed before polishing so that tearing or cutting of the felts is greatly reduced.

Although the preferred embodiment of the invention has been disclosed above, it will be appreciated that the tendency of the ribbon or sheet to bulge or curl at the edges may also be eliminated by other means such as by a scraper. Furthermore, while the invention has been described particularly with regard to the simultaneous surfacing of both sides of a sheet or ribbon of glass, it may also be used where the ribbon or sheet material is cut into individual sheets or blanks and embedded in plaster on cars or tables which pass beneath only upper surfacing wheels or discs.

It is of course to be understood that the form of the invention herein disclosed is to be taken as the preferred embodiment thereof, and that various changes in the shape, size and arrangement of parts may be resorted to without departing from the spirit of the invention or the scope of the following claims.

I claim:

1. An apparatus adapted to engage the opposed marginal portions of an endless glass ribbon which is being continuously carried along a continuous pathway from glass ribbon forming rollers to an annealing lehr, which apparatus includes a pair of freely rotatable shaping rollers disposed along opposite sides of the glass ribbon engaging the ribbon in their operative position, a pair of roller mounting means, one located on each side of said glass ribbon, each of said mounting means including first adjustable means whereby said rollers are shiftable substantially horizontally and transversely of the glass ribbon, second adjusting means whereby the horizontally extending axes of rotation of said rollers may be inclined at an acute angle to the horizontal and means operatively connected to said rollers whereby said rollers exert pressure on the glass ribbon so that the edge thickness of the glass at each edge is less than the thickness of the glass ribbon between the edges.

2. Apparatus for use in combination with apparatus for producing a glass sheet which is surfaced simultaneously on both sides thereof by opposed surfacing tools, comprising, a glass shaping tool contacting the marginal edge portions of the sheet, while it is in a pliable condition, to depress the edge portions below the substantially horizontal plane of the major surface area of the sheet, mounting means holding said tool in engagement with said glass sheet and means operably connected to said mounting means for changing the angle at which said shaping tool engages the glass sheet, said mounting means including a support frame, a first rotatable shaft carried by said frame, a second rotatable shaft and means mounting said second shaft on said first shaft, said shaping tool being pivotally carried by said second shaft.

3. Apparatus as claimed in claim 2, wherein said shaping tool includes a rotatable wheel having a substantially flat surface.

4. An apparatus as defined in claim 2, wherein said means for changing the angle of said shaping means includes an adjustment device connected to said second shaft for rotating said second shaft relative to said first shaft.

5. An apparatus as defined in claim 2, including means connected to said first shaft for changing the pressure exerted by said shaping tool on the glass sheet.

6. An apparatus adapted to engage the marginal portions of an endless plate glass ribbon which is being continuously carried along a continuous pathway from plate glass ribbon forming rollers to an annealing lehr, which apparatus includes, glass shaping means disposed along opposite sides of the plate glass ribbon, means mounting said glass shaping means in bearing contact with the plate glass ribbon along a line substantially transverse to the direction of movement of the plate glass ribbon along the continuous pathway, said mounting means including first adjusting means shifting said glass shaping means transversely of the plate glass ribbon, and adjusting means inclining the transverse line of contact, between the plate glass ribbon and said glass shaping means, at an acute angle with respect to the substantially flat surface of the plate glass ribbon between the edges of the plate glass ribbon so that the edge thickness of at least a portion of the plate glass ribbon along both edges, where contacted by the glass shaping means, will be less than the thickness of the plate glass ribbon between the edges, and means operatively connected to said mounting means for controlling the amount of pressure exerted by said glass shaping means on the plate glass ribbon.

References Cited in the file of this patent

UNITED STATES PATENTS

| | | |
|---|---|---|
| 1,032,239 | Player | July 9, 1912 |
| 1,280,139 | Bolin | Oct. 1, 1918 |
| 1,560,078 | Gelstharp | Nov. 3, 1925 |
| 1,805,250 | Mambourg | May 12, 1931 |
| 2,176,480 | Waldron et al. | Oct. 19, 1939 |
| 2,272,651 | Waldron et al. | Feb. 10, 1942 |

UNITED STATES PATENT OFFICE

CERTIFICATE OF CORRECTION

Patent No. 2,948,989                        August 16, 1960

Delmar E. Carney

It is hereby certified that error appears in the printed specification of the above numbered patent requiring correction and that the said Letters Patent should read as corrected below.

Column 6, line 23, after "and" insert -- second --.

Signed and sealed this 4th day of April 1961.

(SEAL)
Attest: ERNEST W. SWIDER
Attesting Officer

ARTHUR W. CROCKER
Acting Commissioner of Patents